A. H. KENNEDY.
Sheep Shears.
No. 2,615. Reissued May 14, 1867.
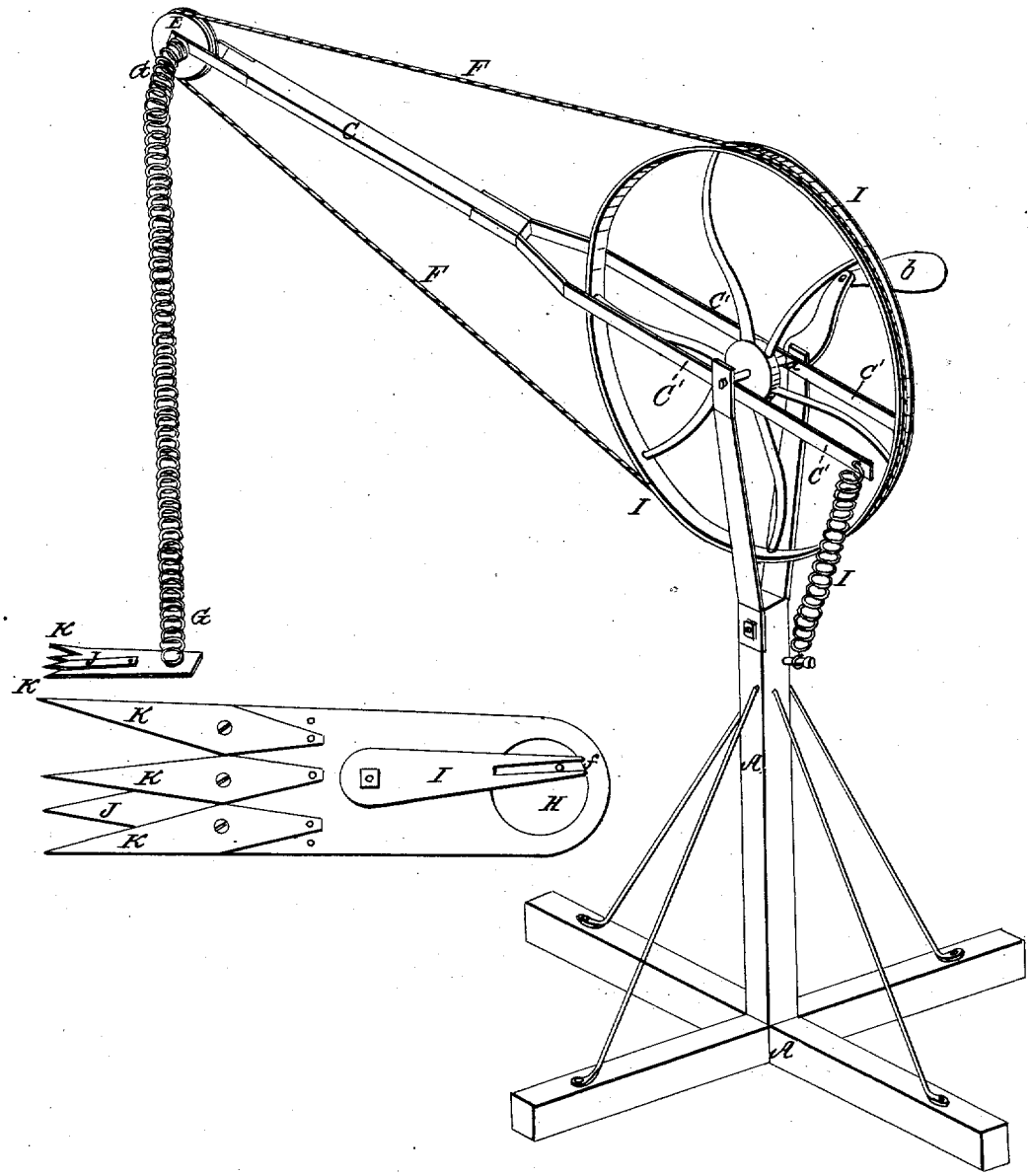
Witnesses:
Jno. D. Patten
Thos. J. Chamberlain.
Inventor
Albert H. Kennedy
By Atty A. B. Stoughton
N. PETERS, Photo-Lithographer, Washington, D. C.

United States Patent Office.

LEWIS MILLER AND R. B. WALKER, OF AKRON, OHIO, ASSIGNEES BY MESNE ASSIGNMENTS OF ALBERT H. KENNEDY.

*Letters Patent No.* 52,293, *dated January* 30, 1866; *reissue No.* 2,615, *dated May* 14, 1867.

MACHINE FOR SHEARING SHEEP.

The Schedule referred to in these Letters Patent and making part of the same.

TO ALL WHOM IT MAY CONCERN:

Be it known that I, ALBERT H. KENNEDY, of Brunswick, in the county of Medina, and State of Ohio, have invented certain new and useful improvements in machines for shearing wool from sheep, which I call the "Kennedy Sheep-Shearer;" and I do hereby declare that the following is a full, clear, and exact description of the same, reference being had to the accompanying drawings, representing the machine in perspective, and the shears detached and on an enlarged scale, and the letters of reference on said drawings.

My invention consists, first, in an extension arm connected to the stand or main frame, or a support thereon, by a hinge, so that it can be raised or lowered at the will of the operator. My invention further consists in an extended arm so balanced as to release the weight of the shaft from the operator, and also to take up the slack of the connecting-shaft. My invention further consists in the use of a coiled wire shaft for transmitting motion to the shears from the first moving power, or the power to which it is connected. My invention further consists in spanning the extended arm over the main driving-wheel for the purpose of giving strength and compactness to the machine and its working parts.

To enable those skilled in the art to make and use my invention, I will proceed to describe the same with reference to the drawings.

A represents a stand or frame, upon which, in suitable supports, is hung a shaft, *a*, which shaft may be driven by a crank, *b*, or in any other equally well-known way. Upon this shaft *a* there is a belt or pulley-wheel, B, from whence the power to drive the shears is taken. Upon the shaft *a* is hung the extended arm C, by means of the spanned or forked arms C′ C′, which arms are part and parcel of said extended arm, being forked or divided to afford a wider and better bearing on said shaft, and so as to embrace between said arms the belt or pulley-wheel. One of the arms C′, at least, should extend rearward of the shaft *a* to which they are hinged, so that its other or forward and longer end may be balanced, which I do by a spring, D, connected to said rear end, and to the main frame or stand A, and thus relieve the operator of the necessity of raising said extended arm and working it as the operation of the machine may require. In bearings in the forward end of the extended and balanced arm there is a pulley, E, around which, and around the pulley B on the main driving-shaft, passes an endless belt, band, or cord, F, which gives motion to the pulley E. To the shaft or journal of the pulley E one end of a coiled wire shaft, G, is connected, the other end of said shaft being connected to an eccentric or wrist-wheel, H, the wrist-pin *c* of which works in a slotted lever, I, connected to and which vibrates the moving shear-blade or cutter J with great rapidity of motion over the fingers K. The very great flexibility of the coiled wire shaft G allows the shears to be moved and turned in any direction whilst they are in working motion, even to turning them upside down if necessary. The power or motion to drive the shears operates by the torsion of the shaft G, and the shaft may have one or more full turns, or a half knot put in it without impairing its driving action, so that it may be shortened at pleasure if too long or in the way, or made to extend to any reasonable distance. In guiding and directing the shears, which the operator does with one hand, whilst the other is free to hold the animal or move away the clipped fleece, he can draw down the forward end of the hinged and balanced extended arm C by the shaft G without impeding its motion in the least, and when the said shaft G tends to become slack, by raising the cutters the arm will rise up again by force of the balancing or controlling device on the other side of its hinged support.

Having thus fully described my invention, what I claim therein as new, and desire to secure by Letters Patent, is—

1. The extension arm made with a hinge so that it can be raised or lowered at the will of the operator, substantially as and for the purpose set forth.

2. I also claim, in combination with the extended arm, the balancing of it, so that the operator shall be relieved of the weight of the arm in raising it, and also for the purpose of taking up the slack of the connecting-shaft, substantially as described.

3. I also claim the coiled wire shaft for transmitting the driving power to the shears, substantially as described.

4. I also claim spanning or extending the arm C over the main driving-shaft and pulley for the purpose of better support, more strength, and greater compactness, substantially as described.

A. H. KENNEDY.

Witnesses:
W. P. HANES,
C. C. KENYON.